(12) United States Patent
Korakis et al.

(10) Patent No.: US 8,094,634 B2
(45) Date of Patent: Jan. 10, 2012

(54) SENDER AND/OR HELPER NODE MODIFICATIONS TO ENABLE SECURITY FEATURES IN COOPERATIVE WIRELESS COMMUNICATIONS

(75) Inventors: Thanasis Korakis, Brooklyn, NY (US);
Salik Makda, Jersey City, NJ (US);
Shivendra S. Panwar, Freehold, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 673 days.

(21) Appl. No.: 12/206,126

(22) Filed: Sep. 8, 2008

(65) Prior Publication Data
US 2009/0122770 A1  May 14, 2009

Related U.S. Application Data

(60) Provisional application No. 60/967,978, filed on Sep. 6, 2007.

(51) Int. Cl.
*H04W 8/00* (2009.01)
*H04B 7/00* (2006.01)
(52) U.S. Cl. ............................. 370/338; 370/392
(58) Field of Classification Search ............ 370/338, 370/310, 315, 349, 392, 474
See application file for complete search history.

(56) References Cited

U.S. PATENT DOCUMENTS

| | | | |
|---|---|---|---|
| 2007/0076855 A1* | 4/2007 | MeLampy et al. | 379/88.17 |
| 2007/0280249 A1* | 12/2007 | Draves, Jr. | 370/392 |
| 2007/0286393 A1* | 12/2007 | Roever et al. | 379/221.1 |
| 2008/0062901 A1* | 3/2008 | Kadowaki et al. | 370/310 |
| 2008/0065888 A1* | 3/2008 | Zheng et al. | 713/171 |
| 2008/0184331 A1* | 7/2008 | Cam-Winget et al. | 726/1 |
| 2008/0304485 A1* | 12/2008 | Sinha et al. | 370/392 |

OTHER PUBLICATIONS

S. Makda et al., "Security Implications of Cooperative Communications in Wireless Networks," *Proceedings of IEEE Sarnoff 2008*, Princeton, NJ, USA (Apr. 2008).

S. Makda, "Study and Implementation of Cooperative MAC Protocol for Wireless Local Area Networks," *Master of Science in Telecommunication Networks*, Polytechnic University (Submitted Dec. 2006).

* cited by examiner

*Primary Examiner* — Brian Nguyen
(74) *Attorney, Agent, or Firm* — John C. Pokotylo; Straub & Pokotylo

(57) ABSTRACT

Wireless protocols that employ a helper node are adapted so that they may take advantage of authentication security (and perhaps encryption security). Thus, such protocols may be used with security protocols such as 802.11i protocol (or the like) for example.

19 Claims, 8 Drawing Sheets

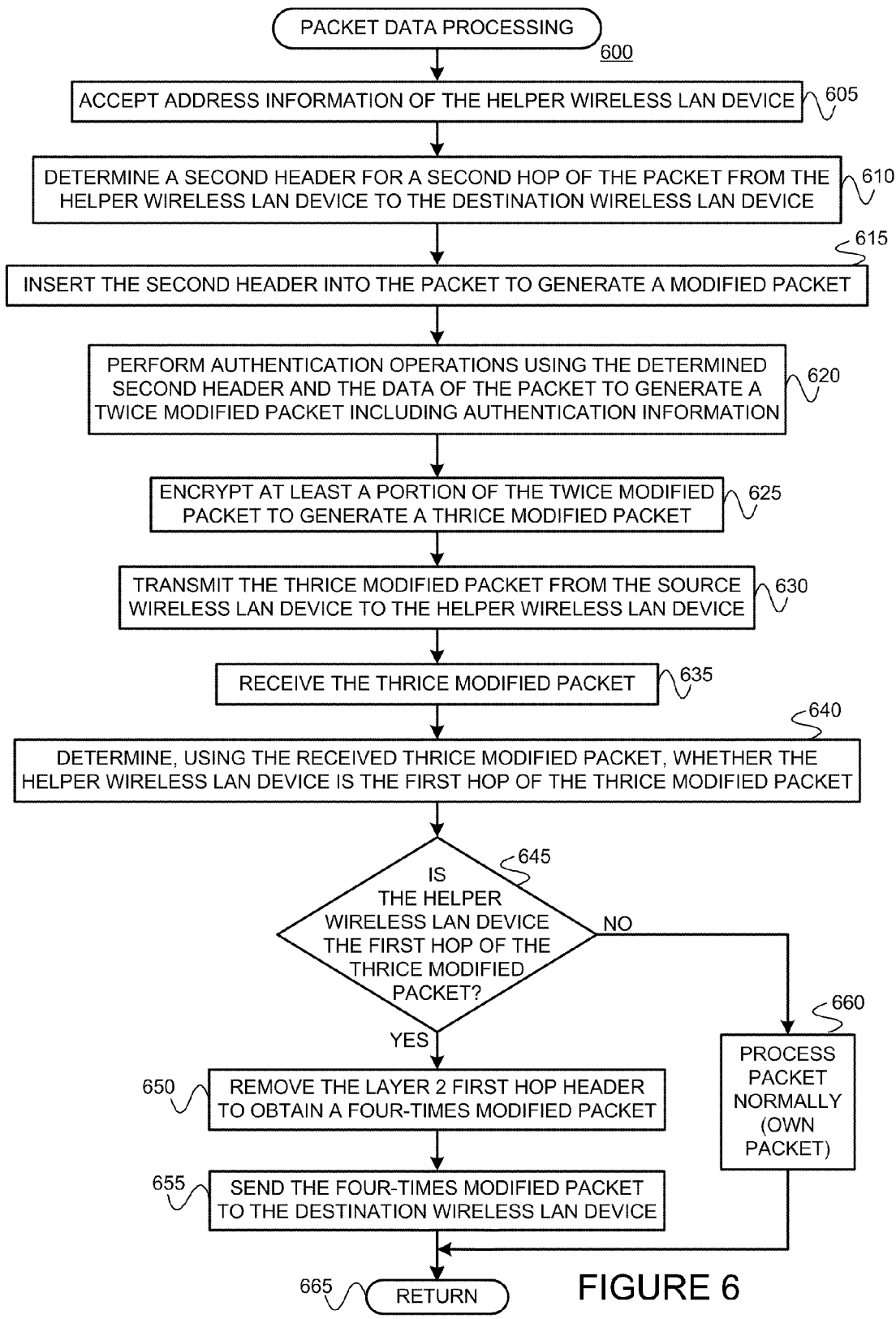

SENDER AND/OR HELPER NODE MODIFICATIONS TO ENABLE SECURITY FEATURES IN COOPERATIVE WIRELESS COMMUNICATIONS

§0. PRIORITY CLAIM

Benefit is claimed, under 35 U.S.C. §119(e)(1), to the filing date of U.S. provisional patent application Ser. No. 60/967, 978 (referred to as "the '978 provisional" and incorporated herein by reference), titled "STUDY OF SECURITY OF A COOPERATIVE MAC PROTOCOL", filed on Sep. 6, 2007, and listing Thanasis KORAKIS, Salik MAKDA and Shivendra PANWAR as the inventors, for any inventions disclosed in the manner provided by 35 U.S.C. §112, ¶ 1. The scope of the present invention is not limited to any requirements of the specific embodiments described in the '978 provisional application.

§1. BACKGROUND

§1.1 Field of the Invention

The present invention concerns wireless communications. More specifically, the present invention concerns enabling certain security features in wireless communications, such as communications taking place in a wireless LAN in which a "helper" node helps a source node to send data to a destination node.

§1.2 Background Information

U.S. Pat. No. 7,330,457 (referred to as "the '457 patent" and incorporated herein by reference) describes an improvement over the then current IEEE 802.11 protocol. More specifically, the '457 patent describes a media access control (referred to as "MAC") protocol that can achieve better performance, provide fair service, reduce interference, and improve coverage in an area covered by multiple access points, while being backwards compatible with current IEEE 802.11 standards. Further, the approach described in the '457 patent could be used with other wireless techniques and protocols.

As described in the '457 patent, a helper node can be used to forward data from a source node to a destination node in accordance with a Cooperative MAC protocol (referred to as "CoopMAC"). Generally, under the CoopMAC protocol, when it is advantageous to do so, each station sends the data packets to a destination station via an intermediate station, instead of to the destination station directly. That is, the intermediate station, which serves as a helper to the source, forwards packets received from the source station to the intended destination station. This cooperative data transmission approach can result in system performance improvement if the total time consumed by two-hop transmission (i.e., transmission via the helper station) is less than direct transmission. Such a determination may be made using rate information stored at each station. Specifically, using the rate information, signaling needed to set up a transmission, the amount of data to be transmitted, etc., transmitting the data directly and via a help station may be compared.

FIG. 1 (which corresponds to FIG. 1 of the '457 patent) illustrates transmission paths between a source station 105, a helper station 110 and a destination station 115. In particular, it illustrates a transmission via a helper station 110 versus a direct transmission from source 105 to destination 115. In FIG. 1, the dashed arrow represents the legacy direct data transmission path, while the solid lines show cooperative data forwarding at the MAC layer done in a manner consistent with the present invention.

Although the CoopMAC protocols described in the '457 and the like provide numerous advantages, a number of security issues may need to be considered. One potential security issue is that the helper might change the destination address of the intended recipient of the frame. Thus, the frame will reach a node not intended by the source. The source might not know this, so it will think that it is communicating with the intended recipient and may end up voluntarily sending it privileged information, such as username and passwords. This type of an attack is possible when no wireless encryption scheme is used and if the Wired Equivalent Privacy (referred to as "WEP") scheme is used. If no wireless encryption scheme is employed, then an alteration of the address field in the header cannot be detected. In a related security issue, the payload might be modified. Such a modification might go undetected if no encryption or WEP is used and if there is a single shared key. Under WEP, an integrity check value (referred to as "ICV") is calculated over the data or payload portion only. Consequently, any changes to the header would not be detectable. The Rivest Cipher 4 (referred to as "RC4") stream cipher used in WEP, with a 24-bit initialization vector (referred to as "IV"), has a 50% probability of reuse after 5000 packets. If compromised, it can be used by an attacker.

Another security issue is that the helper might modify the packet payload before forwarding the packet. This can be easily done when no encryption is used and even when WEP is used if the key has been compromised. This cannot be easily avoided unless the transmitter and receiver can themselves find that there is a lot of delay in the received packets (which will be caused by calculations of CRC, etc. at the helper), in which case they may use some other helper.

As noted above, encryption might be used to avoid certain security issues. IEEE 802.11i, also known as WiFi Protected Access 2 (referred to as "WPA2"), is an amendment to the 802.11 standard specifying security mechanisms for wireless networks. Since WEP has been shown to have severe security weaknesses, WPA had previously been introduced as an intermediate solution to WEP insecurities. WPA implemented a subset of 802.11i. 802.11i makes use of the Advanced Encryption Standard ("AES") block cipher. WEP and WPA use the RC4 stream cipher.

The 802.11i architecture uses 802.1X for authentication, RSN for keeping track of associations, and AES-based Counter Mode with Cipher Block Chaining Message Authentication Code Protocol (referred to as "CCMP") to provide confidentiality, integrity and origin authentication. Like WPA, 802.11i has a pre-shared key (referred to as "PSK") mode designed for home and small office networks that cannot afford the cost and complexity of an 802.1X authentication server. Using PSK, each user must enter a passphrase to access the network. The passphrase is typically stored on the user's computer, so it need only be entered once.

802.11i uses Temporal Key Integrity Protocol (referred to as "TKIP") as a security protocol in WPA. FIG. 2 illustrates a TKIP MAC Protocol Data Unit (referred to as "MPDU"). WPA is used for WiFi networks to correct deficiencies in the older WEP standard. TKIP was designed to replace WEP without replacing legacy hardware. (This was important because the breaking of WEP had left WiFi networks without viable link-layer security, and the solution to this problem could not wait for the replacement of deployed hardware.) For this reason, like WEP, TKIP uses a key scheme based on RC4. However, unlike WEP, TKIP provides per-packet key mixing, a message integrity check and a rekeying mechanism. TKIP ensures that every data packet is sent with its own unique encryption key. Key mixing increases the complexity of decoding the keys by giving the cracker much less data that has been encrypted using any one key. The message integrity check prevents forged packets from being accepted.

Under WEP, it was possible to alter a packet whose content was known even if it had not been decrypted. TKIP also hashes the initialization vector (referred to as "IV") values, which are sent as plaintext, with the WPA key to form the RC4 traffic key, addressing one of WEP's largest security weaknesses. WEP simply concatenated its key with the IV to form the traffic key, allowing a successful related key attack.

802.11i uses CCMP as an encryption protocol. FIG. 3 illustrates a CCMP MPDU. CCMP was created, together with TKIP, to replace an earlier, insecure, WEP protocol. CCMP uses the Advanced Encryption Standard (referred to as "AES") algorithm. Unlike TKIP, with CCMP, key management and message integrity are handled by a single component built around AES. Data is encrypted using counter (referred to as "CTR") mode AES. Authentication is achieved by using a Cipher Block Chaining Message Authentication Code (referred to as "CBC-MAC"). This combination of CTR and CBC-MAC is what constitutes CCMP. CCMP encapsulations attempt to ensure the confidentiality and integrity of the communications channel, and to prevent replay attacks. Integrity is assured by calculating a Message Integrity Code (referred to as "MIC") sum to check if a message is altered, protecting data from replay attacks.

As can be appreciated from the foregoing, it would be useful to address security issues inherent in wireless communications protocols that use a helper node to forward data from a source node to a destination node, such as CoopMAC for example. It would be useful to allow authentication and/or encryption, such as that proposed in 802.11i for example.

§2. SUMMARY OF THE INVENTION

Embodiments consistent with the present invention enable certain security features in wireless communications using a helper node (when transmitting a packet, including a header and data, from a source wireless device to a destination wireless device, via a helper wireless device). At least some such embodiments might do so by (a) accepting address information of the helper wireless device, (b) determining a second header for a second hop of the packet from the helper wireless device to the destination wireless device, (c) inserting the second header into the packet to generate a modified packet, (d) generating a twice modified packet by at least performing authentication operations using the determined second header and the data of the packet (wherein the twice modified packet includes authentication information), and (e) transmitting the twice modified packet from the source wireless device to the helper wireless device. At least some other such embodiments might do so by (a) accepting address information of the helper wireless device, (b) determining a header for a second hop of a packet including the data from the helper wireless device to the destination wireless device, (c) performing authentication using the determined header and the data to generate a modified packet including authentication information, (d) generating a twice modified packet by at least replacing the determined header of the modified packet with a second header for a first hop of a packet including the data from the source wireless device to the helper wireless device, and (e) transmitting the twice modified packet from the source wireless device to the helper wireless device.

§3. BRIEF DESCRIPTION OF THE DRAWINGS

Figure 5:
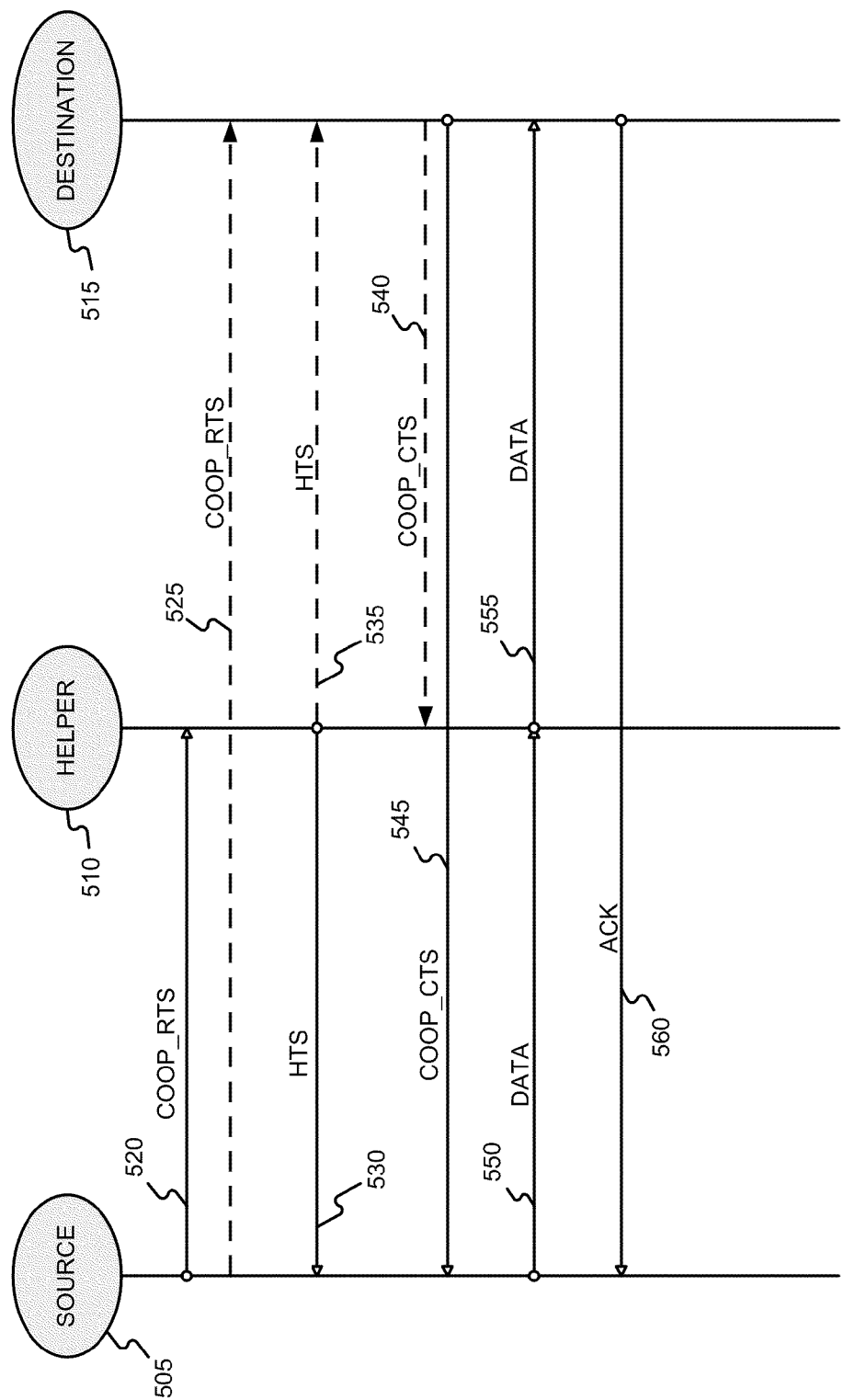

FIG. 5 is a messaging diagram illustrating the communication of control packets, data packets, and acknowledgment packets between a source station 505, a helper station 510, and a destination station 515 in an exemplary environment with which, or in which, embodiments consistent with the present invention may be used.

FIG. 6 is a flow diagram illustrating a first exemplary method for processing data packets in a manner consistent with the present invention.

FIGS. 7A-7E illustrate packet information, as processed by the exemplary method of FIG. 6.

Figure 8:
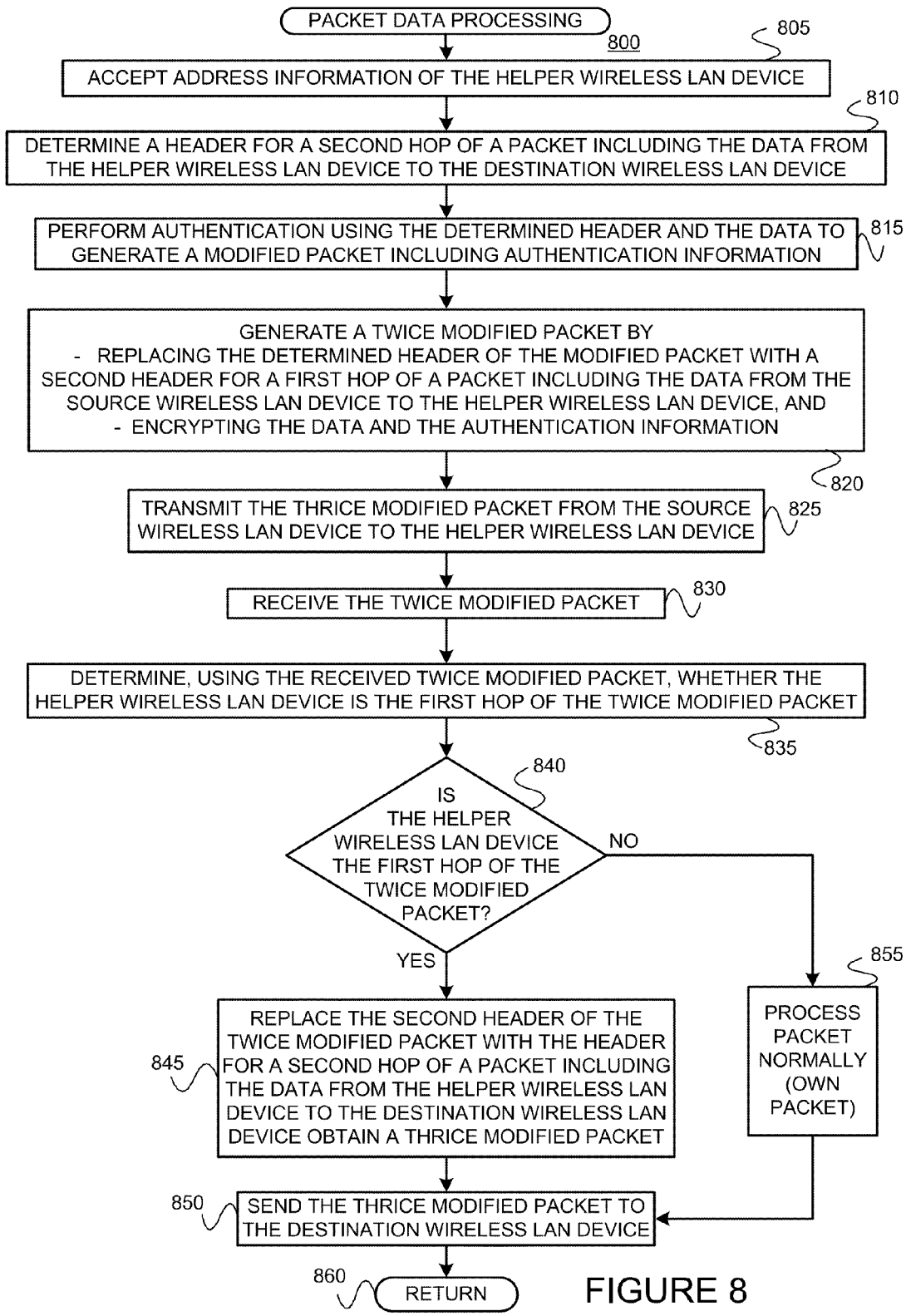

FIG. 8 is a flow diagram illustrating a second exemplary method for processing data packets in a manner consistent with the present invention.

FIGS. 9A-9D illustrate packet information, as processed by the exemplary method of FIG. 8.

§4. DETAILED DESCRIPTION

The present invention may involve novel methods, apparatus, message formats, and/or data structures for enabling certain security features in wireless communications using a helper station or node. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

§4.1 Overview

Figure 1:
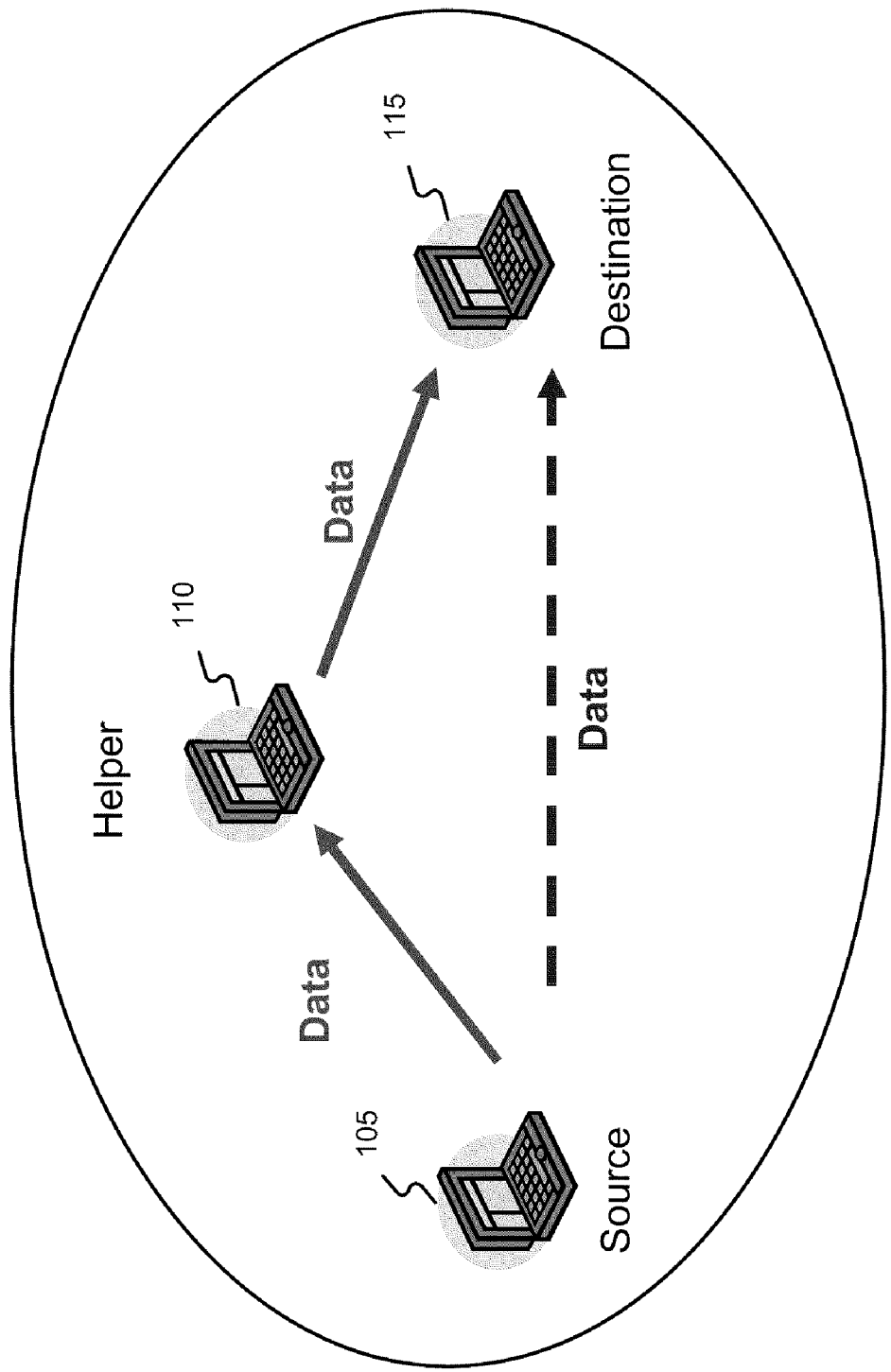
FIG. 1 illustrates transmission paths between a source station, a helper station and a destination station.
Figure 2:
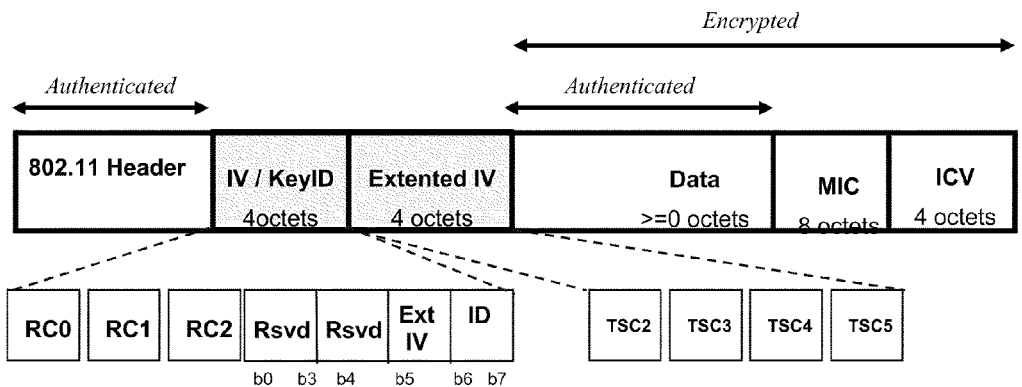
FIG. 2 illustrates a TKIP MPDU.
Figure 3:
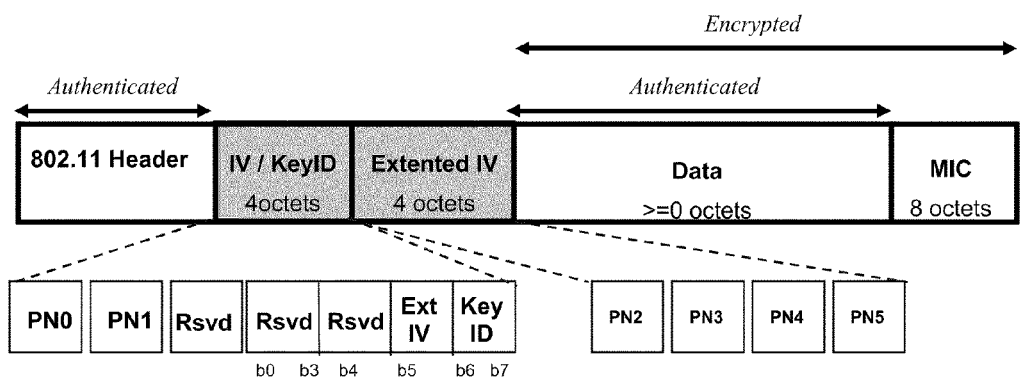
FIG. 3 illustrates a CCMP MPDU.
Figure 4:
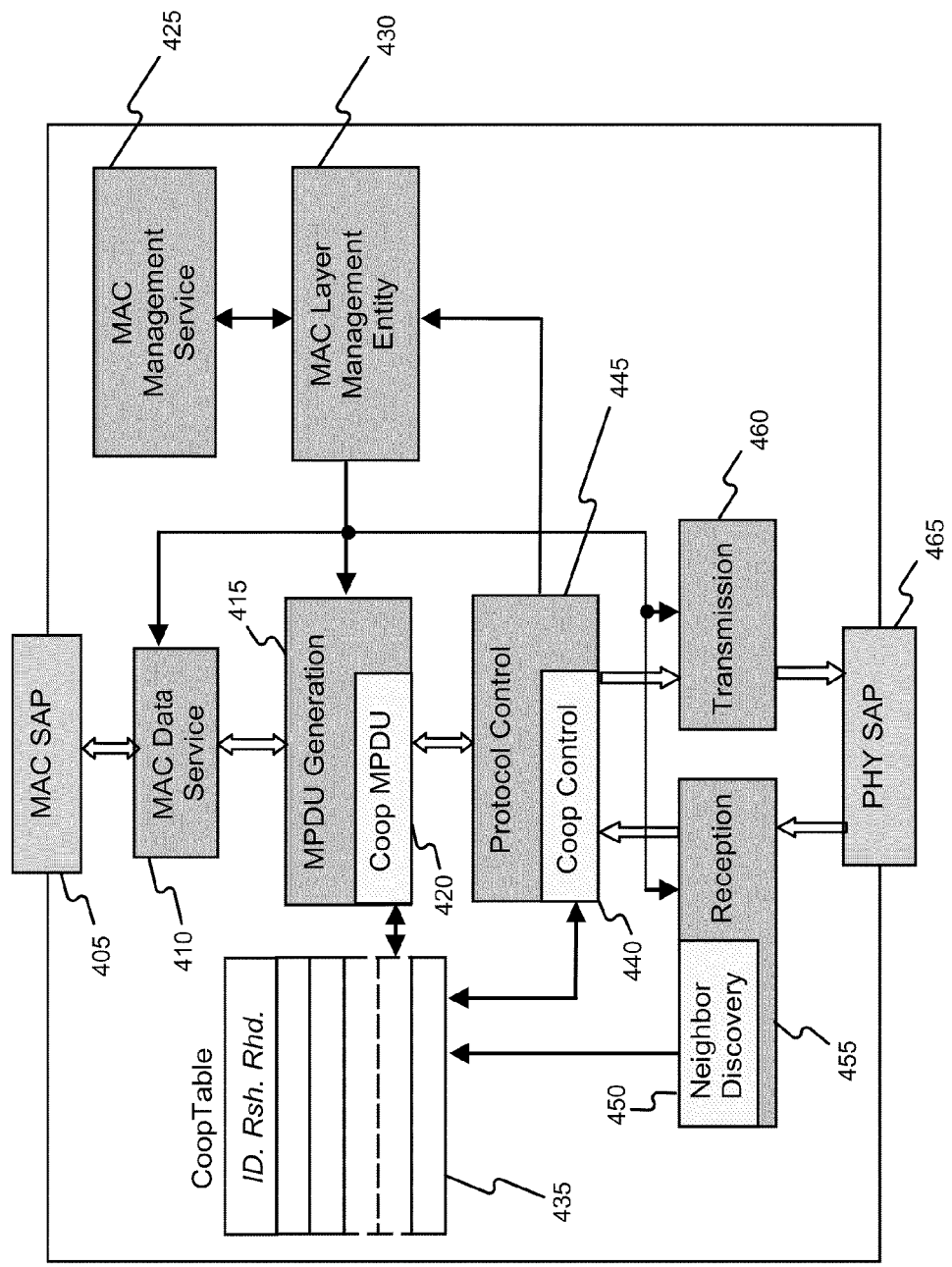
FIG. 4 is a block diagram of an exemplary device with which, or in which, embodiments consistent with the present invention may implemented.

FIG. 4 is a block diagram of an exemplary device with which, or in which, embodiments consistent with the present invention may be implemented. FIG. 4 corresponds to FIG. 14 of the '457 patent, but is described here for the reader's convenience.

According to the formal description of MAC operation of ANSI/IEEE Standard 802.11b, the MAC provides the MAC-SAP (service access point) interface to the logical link control (referred to as "LLC") layer to convey MAC Service Data Unit (referred to as "MSDU") and uses the physical sub-layer service access point (referred to as "PHY-SAP") to interact with the PHY layer. The exemplary embodiment of FIG. 4 may include six (6) main modules, each represented by a single block. The modules may include (i) a MAC Data Service Module (e.g., same as Standard 802.11) 410, (ii) an MPDU Generation Module 415, (iii) a Protocol Control Module 440, (iv) a Transmission Module (e.g., same as Standard 802.11) 460, (v) a Reception Module 455, and (vi) a MAC Layer Management Module (e.g., same as Standard 802.11) 430. All the parameters of the primitives are stored in the corresponding block and can be exchanged between all the modules.

The functions that may be performed by each module are described below. The MAC Data Service Module 410 may receive MSDU from LLC FSM (Finite State Machine), add a basic MAC header and send to the MPDU generation 415. It 410 may also extract appropriate address and status information from the received MAC MSDU, and generate an indication to LLC.

The MPDU Generation Module 415 may find the optimum helper node by checking the helper table, generate the MPDU, add the MAC address of the helper if two hop transmission is faster, and prepare the FSM and fragmenting.

The Protocol Control Module 445 may generate RTS/CTS/HR frames, send MPDU to Tx Module or generate an indication to the MPDU generation module for the received data, generate the ACK frame, manage the Helper table (e.g., delete, update, etc.), route packet from the source node to the destination node, and manage frame to MLME 430.

The Transmission Module 460 may handle backoff FSM and calculate the random backoff, and data pump FSM and send MPDU to the PHY.

The Reception Module 455 may receive an MPDU from the PHY 465. Channel State FSM may maintain channel state based on physical and virtual carrier sensing. Neighboring node discovery 455 may add and update neighbor nodes. The reception module 455 may also filter the received frame, detect duplicated frames, and assemble the fragmented frames. The MAC Layer Management Module 430 may associate, re-associate and disassociate, perform synchronization of time, beacon, etc., perform power management, perform authentication, and distribute MPDUs 415 FSM.

The exemplary embodiment only modifies the MAC layer of the traditional 802.11, and can therefore be based on any one of the IEEE 802.11 physical layers. The implementation can be based on the 802.11 chipsets available on the market by re-programming the MAC controllers. It can also be implemented in hardware, such as FPGAs or ASICs. Another implementation includes using a wireless LAN network interface card (NIC) that includes only transmit/receive functionality and a NIC device driver, which allows the MAC layer protocol to be implemented by software. Thus, various aspects of the present invention may be implemented as stored program instructions executed by one or more processors, and/or in hardware.

The methods described in §§4.2 and 4.3 below may be implemented, for example, in the protocol control module 440 of the device of FIG. 4.

FIG. 5 is a messaging diagram illustrating the communication of control packets, data packets, and acknowledgment packets between a source station 505, a helper station 510, and a destination station 515 in an exemplary environment with which, or in which, embodiments consistent with the present invention may be used. This example assumes that the source station 505 has determined that it would be beneficial to send data to the destination station 515 via the helper station 510. FIG. 5 corresponds to FIG. 15 of the '457 patent, but is described here for the reader's convenience.

The source station may initially broadcast a Coop_RTS message (e.g., packet) 520 to the helper station 510, indicating that it is ready to send data and desires the help of the helper station 510. Meanwhile the destination station 515 may overhear the transmitted Coop_RTS message as indicated by the dashed line 525.

In return, the helper station 510, may broadcast an HTS message (e.g., packet) 530, back to the source station 505, thereby indicating that it is ready to help relay data. Again, the destination station 515 may overhear the transmitted HTS message as indicated by the dashed line 535. As a result, the destination station 515 may broadcast a Coop_CTS message 545 back to the source station 505. This time, it is the helper station 510 that may overhear the transmitted Coop_CTS message, as indicated by the dashed line 540.

Since the source station 505 has received the Coop_CTS message 545, it may now transmit its data to the helper station 510, indicated by 550. In turn, the helper station 510 may relay the data by transmitting it to the destination station 515 as indicated by 555. Once the destination station 515 receives the data, it may then send an ACK packet directly back to the source station 505 as indicated by 560. Thus the communication and exchange of data between a source station and a destination station through the aid of a helper station has been completed. The methods described in §§4.2 and 4.3 below, may be used when sending information from the source station 505 to the helper station 510 (and before sending information from the helper station 510 to the destination station 515).

Regarding the first potential security issue in the Coop-MAC protocol discussed in §1.2 above (in which the helper might change the destination address of the intended recipient of the frame, the frame will reach a node not intended by the source and the source might not know this, so it will think that it is communicating with the intended recipient and may end up voluntarily sending it privileged information, such as username and passwords), wireless encryption schemes such as those used in 802.11i may be used. However, the use of authentication and/or encryption, such as that proposed in 802.11i for example, is complicated when a helper node is used. More specifically, since CoopMAC modifies the IEEE 802.11 header for the transmission between source to helper and helper to destination, CoopMAC as described in the '457 patent will not be compatible with 802.11i. This is because in both the TKIP and AES modes, there is a strong integrity check on the payload of the data, as well as on the header. This check calculates a message integrity check (referred to as "MIC") over the source and destination address as well as the MSDU plaintext data. Thus, if the helper changes anything in the header, the integrity check will fail and the packet will be discarded. No ACK will be issued, so the source will try to retransmit. After a few unsuccessful retransmissions, the transmitter will then blacklist this helper to avoid using it in the future which is not desirable. Embodiments consistent with the present invention address such complications. Such embodiments make CoopMAC compatible with 802.11i by modifying CoopMAC in terms of header manipulation such that it supports authentication (and encryption) mechanisms of 802.11i.

Similarly, regarding the final potential security issue in the CoopMAC protocol discussed in §1.2 above (in which the helper might modify the packet payload before forwarding the packet), if CoopMAC is implemented according to the protocol which requires the retransmission of the packet in SIFS interval (described in the '457 patent), this type of attack will not be possible as the SIFS duration is too short to perform complex calculations and manipulation of the packet.

The following exemplary embodiments are described in the context of a wireless network employing the MAC protocol. However, the present invention is not limited to such embodiments. That is, the present invention can be used in other types of wireless networks that use authentication and/or encryption, as well as a helper node.

§4.2 First Exemplary Embodiment Consistent with the Present Invention

A first exemplary embodiment consistent with the present invention is described with reference to FIGS. 6 and 7A-7E. FIG. 6 is a flow diagram illustrating a first exemplary method 600 for processing packet information in a manner consistent with the present invention. Specifically, FIG. 6 illustrates a method 600 for transmitting a packet, including a header and data, from a source wireless LAN device to a destination wireless LAN device, via a helper LAN device. FIGS. 7A-7E illustrate packet information as processed by the exemplary method of FIG. 6.

Figure 7A:
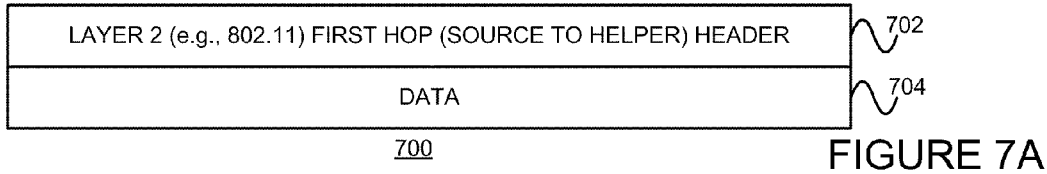
Figure 7B:
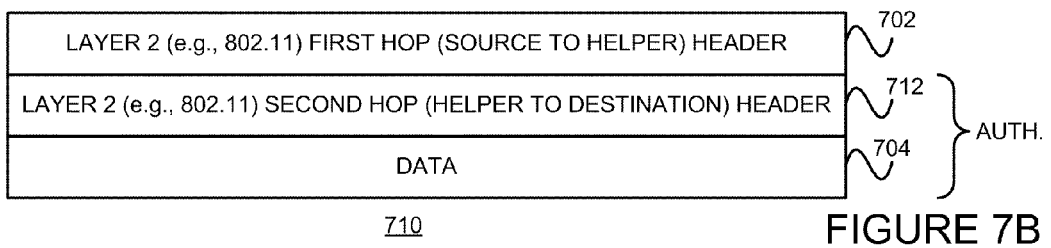

FIG. 7A illustrates a packet 700 including a layer 2 (e.g., 802.11) first hop (from the source wireless LAN device to the helper wireless LAN device) header 702 and data 704. Address information of the helper wireless LAN device is accepted. (Block 605) A second header for a second hop of the packet (from the helper wireless LAN device to the destination wireless LAN device) is determined. (Block 610) The second header is then inserted into the packet to generate a modified packet. (Block 615). As shown in FIG. 7B, an exemplary modified packet 710 includes the layer 2 (e.g., 802.11) second hop (helper to destination) header 712 inserted.

Figure 7C:
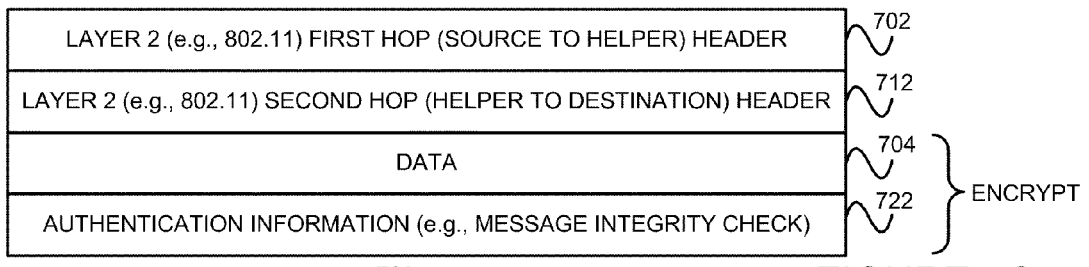

Referring back to FIG. 6, authentication operations are performed using the determined second header and the data of the packet (See the bracketed information in FIG. 7B.) to generate a twice modified packet including authentication information. (Block 620) As shown in FIG. 7C, an exemplary twice modified packet 720 includes authentication information 722. In at least some embodiments consistent with the present invention, the authentication information 722 may be message integrity check information (referred to as "MIC"). The MIC (Message Integrity Check) is an 8 byte field which is placed between the data portion and the 4 byte Integrity Check Value ("ICV"). The MIC has a function similar to the older ICV. However, the ICV only protects the packet payload. The MIC protects both the payload and the header.

Figure 7D:
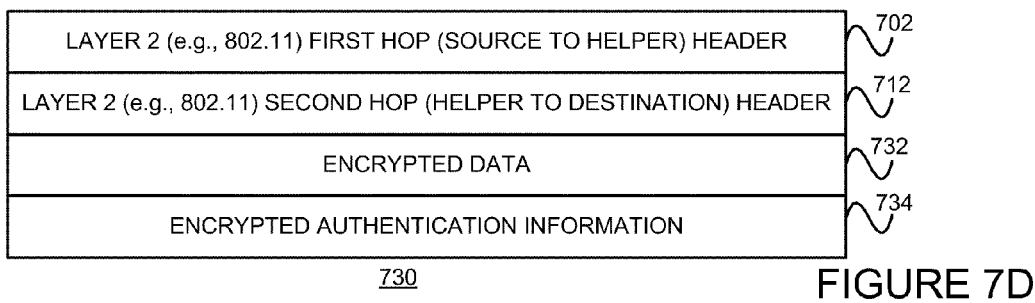

Referring back to FIG. 6, at least a portion of the twice modified packet may be encrypted to generate a thrice modified packet. (Block 625) As shown in FIG. 7D, an exemplary thrice modified packet 730 may include the layer 2 first hop header 702, the layer 2 second hop header 712, encrypted data 732 and encrypted authentication information 734. In at least some embodiments consistent with the present invention, the encryption of the information may be performed using any encryption protocol such as, for example, WAP or WPA2.

Figure 7E:
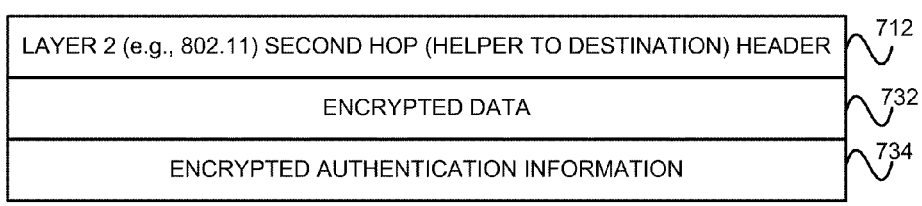

Referring back to FIG. 6, the thrice modified packet may be transmitted from the source wireless LAN device to the helper wireless LAN device (Block 630) and received (e.g., with the helper wireless LAN device). (Block 635) Using the received thrice modified packet, it is determined whether this is the first hop transmission (whether the receiver is a helper or the final destination of the thrice modified packet). (Decision block 645) Since it is, the method 600 then (1) removes the layer 2 first hop header to obtain a four-times modified packet (Block 650), and (2) sends the four-times modified packet to the destination wireless LAN device (Block 655). Referring to FIG. 7E, an exemplary four-times modified packet 740 includes the layer 2 second hop header 712, the encrypted data 732 and the encrypted authentication information 734.

Referring back to decision block 645 of FIG. 6, if the receiving wireless LAN device receives a packet for which it is the final destination, it may process the packet normally. (Block 660).

Referring back to FIG. 6, some or all of the operations of blocks 605, 610, 615, 620, 625 and 630 may be performed by the source wireless LAN device (or a proxy there for), and some or all of the operations of blocks 635, 640, 645, 650, 655 and 660 may be performed by the helper wireless LAN device (or a proxy there for).

Referring back to decision block 645, the determination of whether the receiver is a helper of the final destination of the thrice modified packet, can be done in various ways. For example, some embodiments consistent with the present invention might use the "address four" subfield of the MAC header. The source (transmitter) sets this address equal to the MAC address of the helper if the packet is transmitted in the first hop, or it leaves it empty in the second hop case. Therefore, the receiver might examine the "address four" of the MAC header, and if it is equal to its own address, then it determines that it is a helper. Otherwise, it determines that it is the final destination.

Although not shown, when the destination wireless LAN device receives the packet, it performs decryption and authentication (e.g., calculates the MIC of the packet and compares it with the original calculated MIC in the packet). Since there has been no modification to the part of the packet used in the calculation of the original MIC, it will successfully clear this integrity check. Thus authenticity of the packet can be verified and privacy of the packet data can be ensured.

§4.3 Second Exemplary Embodiment Consistent with the Present Invention

A second exemplary embodiment consistent with the present invention is described with reference to FIGS. 8 and 9A-9D. FIG. 8 is a flow diagram illustrating a second exemplary method 800 for processing data packets in a manner consistent with the present invention. Specifically, FIG. 8 illustrates a method 800 for transmitting data from a source wireless LAN device to a destination wireless LAN device, via a helper LAN device. FIGS. 9A-9D illustrate exemplary packet information, as processed by the exemplary method of FIG. 8.

Figure 9A:
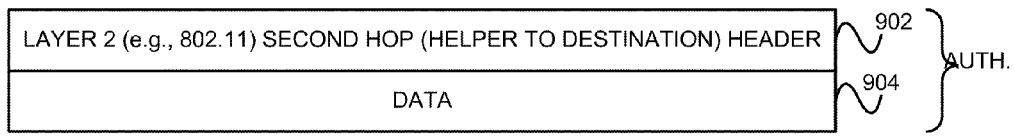
Figure 9B:
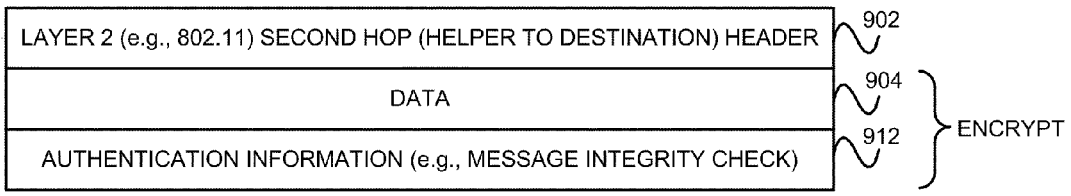

The exemplary method 800 accepts address information of the helper wireless LAN device. (Block 805) A header for a second hop of a packet, including the data, from the helper wireless LAN device to the destination wireless LAN device, is determined. (Block 810) Authentication is then performed using the determined header and the data to generate a modified packet including authentication information. (Block 815) FIG. 9A illustrates exemplary packet information 900 including the layer 2 (e.g., 802.11) second hop (helper to destination) header 902 and the data 904. Authentication processing is performed on this information 900 as indicated by the bracket. FIG. 9B illustrates an exemplary modified packet 910 including the layer 2 second hop header 902, the data 904 and authentication information 912. The authentication information 912 may be message integrity check (MIC) information. The MIC is an 8-byte field which is placed between the data portion and the 4-byte ICV (Integrity Check Value). The MIC has a function similar to the older ICV. However, the ICV only protects the packet payload. The MIC protects both the payload and the header.

Figure 9C:
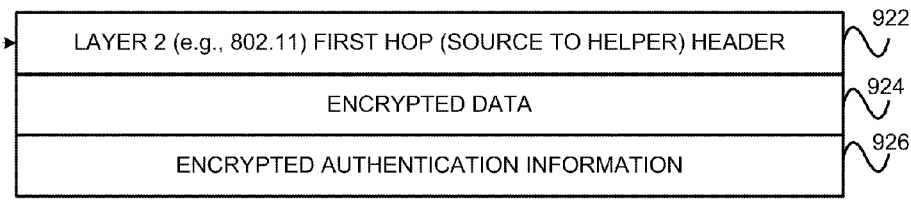
Figure 9D:
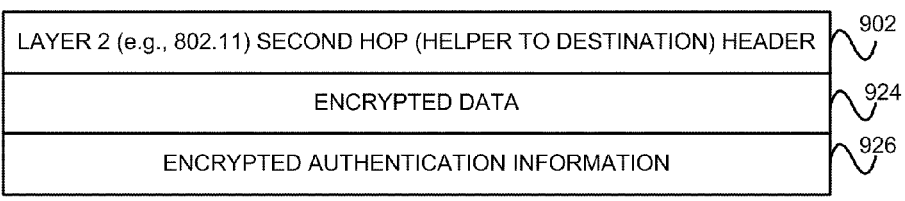

Referring back to FIG. 8, a twice modified packet is generated by replacing the determined header 902 of the modified packet 910 with a second header for a first hop of a packet 922 including the data (from the source wireless LAN device to the helper wireless LAN device), and encrypting the data and the authentication information. (Block 820). Referring to FIG. 9C, exemplary twice modified packet 920 may include the layer 2 first hop (source wireless LAN device to helper wireless LAN device) header 922, encrypted data 924 and encrypted authentication information 926. In at least some embodiments consistent with the present invention, the encryption of the information can be performed using any encryption protocol, such as, for example, WAP or WPA2.

Referring back to FIG. 8, the twice modified packet may then be transmitted from the source wireless LAN device to the helper wireless LAN device. (Block 825) The twice modified packet is then received. (Block 830) Using the received thrice modified packet, it is determined whether this is the first hop transmission (whether the receiver is the helper or the final destination of the thrice modified packet). (Decision block 840) Since it is, the method 800 then replaces the second header of the twice modified packet with the header for a second hop of a packet including the data (from the helper wireless LAN device to the destination wireless LAN device) to obtain a thrice modified packet. (Block 845) Referring to FIG. 9D, an exemplary thrice modified packet 930 may include the layer 2 second hop header 902, the encrypted data 924 and the encrypted authentication information 926. Referring back to FIG. 8, the thrice modified packet is then sent to the destination wireless LAN device. (Block 850)

Referring back to decision block 840 of FIG. 8, if the receiving wireless LAN device receives a packet for which it is the final destination, it may process the packet normally. (Block 855).

Referring back to FIG. 8, some or all of the operations of blocks 805, 810, 815, 820 and 825 may be performed by the source wireless LAN device (or a proxy there for), and some or all of the operations of blocks 830, 835, 840, 845, 850 and 855 may be performed by the helper wireless LAN device (or a proxy there for).

Referring back to decision block 840, the determination of whether the receiver is a helper of the final destination of the thrice modified packet, can be done in various ways. For example, some embodiments consistent with the present invention might use the "address four" subfield of the MAC header. The source (transmitter) sets this address equal to the MAC address of the helper if the packet is transmitted in the first hop, or it leaves it empty in the second hop case. Therefore, the receiver might examine the "address four" of the MAC header, and if it is equal to its own address, then it determines that it is a helper. Otherwise, it determines that it is the final destination.

Although not shown, when the destination wireless LAN device receives the packet, it performs decryption and authentication (e.g., calculates the MIC of the packet and compares it with the original calculated MIC in the packet). Since there has been no modification to the part of the packet used in the calculation of the original MIC, it will successfully clear this integrity check. Thus authenticity of the packet can be verified and privacy of the packet data can be ensured.

§4.4 Exemplary Apparatus

Embodiments consistent with the present invention may be implemented in hardware and/or software (e.g., integrated circuits, field programmable gate arrays ("FPGAs"), application specific integrated circuits ("ASICs"), processor(s) executing stored program instructions, etc.). Such hardware and/or software might be provided in an addressed data (e.g., packet, cell, etc.) forwarding device (e.g., a switch, a router, etc.). As discussed in §4.1 above, various acts of the exemplary methods 600 and 800 described above may be implemented in the 440 module of the device illustrated in FIG. 4. It may be advantageous to implement such embodiments just as the IEEE 802.11 protocol stack is implemented. In such a case, embodiments consistent with the present invention may only need to make minor modifications to the existing IEEE 802.11 protocol stack software implementation.

§4.5 Alternatives and Refinements

Although the exemplary methods and apparatus were described in the context of 802.11i, alternative embodiments consistent with the present invention may be used with any (e.g., wireless) protocol(s) that uses a helper node and employs authentication and encryption. Indeed, alternative embodiments consistent with the claimed invention may be used with any (e.g., wireless) protocol(s) that uses a helper node and employs authentication (and particularly authentication which uses a check involving processing of at least some layer 2 address information). Although the exemplary methods and apparatus were described in the context of a wireless LAN, alternative embodiments consistent with the present invention may be used in the context of wireless networks other than LANs.

Although the exemplary apparatus were described as using authentication and encryption, at least some embodiments consistent with the present invention may be used even when encryption is not used (that is, if only authorization is used).

§4.6 Conclusions

As can be appreciated from the foregoing examples, embodiments consistent with the present invention can be used to ensure that wireless protocols that employ a helper node, such as those protocols described in the '457 patent for example, may take advantage of authentication and/or encryption security, such as that described in the 802.11i protocol.

An important concern with CoopMAC approach described in the '457 patent is that it relies on the helper wireless LAN device for proper forwarding of packets. The helper wireless LAN device has the ability to modify the content of the packet. Embodiments consistent with the present invention address various security concerns with the CoopMAC approach.

In at least some embodiments consistent with the present invention, the helper wireless LAN device cannot decrypt the packet as it does not have the appropriate keys (802.11i uses separate keys for each station and no private keys are shared with the helper wireless LAN device). In at least some embodiments consistent with the present invention, the helper wireless LAN device itself might be an authenticated station using 802.1X, and will therefore be a trusted entity. In order for a bad helper wireless LAN device to be a part of the network in this scenario, the 802.1X server would have to be hacked into.

Although the helper wireless LAN device may try to spoof some packets and send them to the receiver, if it does not have the proper keys, it will not be able to do so. Similarly any kind of session hijacking will not be possible.

Even if there is an insider attack by an authenticated helper wireless LAN device, such an attack should be limited to denial of service by the helper wireless LAN device, and such an attack can occur even in a regular 802.11i network. In any event, upon detection of the loss of packets, the source wireless LAN device can quickly shift to another helper or transmit directly to the destination (and perhaps blacklist the helper so as not to use it later).

Exemplary implementations consistent with the present invention need not open up any other security holes, as the environment may be controlled (by appropriate modification in the driver/firmware) at the source and the helper. Such exemplary implementations do not require any private keys to be disclosed by the source, helper or destination.

What is claimed is:

1. A method for transmitting a packet, including a layer 2 first hop header and data, from a source wireless device to a destination wireless device, via a helper wireless device, the method comprising:
   a) accepting, by the source wireless device, address information of the helper wireless device;
   b) determining, by the source wireless device, a layer 2 second hop header for a second hop of the packet from the helper wireless device to the destination wireless device;
   c) inserting, by the source wireless device, the layer 2 second hop header into the packet to generate a modified packet;
   d) generating, by the source wireless device, a twice modified packet by at least performing authentication operations using the layer 2 second hop header and the data of the packet to generate authentication information authenticating the twice modified packet using the layer 2 second hop header and the data of the twice modified packet, wherein the twice modified packet includes the authentication information; and
   e) transmitting, by the source wireless device, the twice modified packet from the source wireless device to the helper wireless device.

2. The method of claim 1 further comprising:
   f) receiving the twice modified packet;
   g) removing the layer 2 first hop header to obtain a thrice modified packet; and
   h) sending the thrice modified packet to the destination wireless device.

3. The method of claim 2 wherein the acts of receiving the twice modified packet, removing the header to obtain a thrice modified packet, and sending the thrice modified packet to the destination wireless device, are performed by the helper wireless device.

4. The method of claim 1 wherein the source wireless device, the helper wireless device and the destination wireless device are wireless LAN devices, and
   wherein the layer 2 first hop header and the layer 2 second hop header are 802.11 headers.

5. The method of claim 1 wherein the authentication operations include determining message integrity check information.

6. The method of claim 1 wherein act of generating the twice modified packet further includes encrypting at least a portion of the packet after the authentication is performed.

7. The method of claim 6 wherein the act of encrypting includes performing a WiFi protected access-based encryption.

8. A system for transmitting a packet, including a layer 2 first hop header and data, from a source wireless device to a destination wireless device, via a helper wireless device, the system comprising:
   a) means for determining a layer 2 second hop header for a second hop of the packet from the helper wireless device to the destination wireless device;
   b) means for inserting the layer 2 second hop header into the packet to generate a modified packet;
   c) means for generating a twice modified packet by at least performing authentication operations using the layer 2 second hop header and the data of the packet to generate authentication information authenticating the twice modified packet using the second hop header and the data of the twice modified packet, wherein the twice modified packet includes authentication information; and
   d) means for transmitting the twice modified packet from the source wireless device to the helper wireless device.

9. The system of claim 8 further comprising:
   e) means for receiving the twice modified packet;
   f) means for removing the layer 2 first hop header to obtain a thrice modified packet; and
   g) means for sending the thrice modified packet to the destination wireless device.

10. A method for transmitting data from a source wireless device to a destination wireless device, via a helper wireless device, the method comprising:
    a) accepting address information of the helper wireless device;
    b) determining a layer 2 header for a second hop of a packet including the data from the helper wireless device to the destination wireless device;
    c) performing authentication using the layer 2 header and the data to generate a modified packet including authentication information;
    d) generating a twice modified packet by at least replacing the layer 2 header of the modified packet with a layer 2 second header for a first hop of a packet including the data from the source wireless device to the helper wireless device; and
    e) transmitting the twice modified packet from the source wireless device to the helper wireless device.

11. The method of claim 10 wherein the acts of accepting, determining, performing, generating and transmitting are performed by the source wireless device.

12. The method of claim 10 further comprising:
    f) receiving the twice modified packet;
    g) replacing the layer 2 second header of the twice modified packet with the layer 2 header for a second hop of a packet including the data from the helper wireless device to the destination wireless device to obtain a thrice modified packet; and
    h) sending the thrice modified packet to the destination wireless device.

13. The method of claim 12 wherein the acts of receiving the twice modified packet, replacing and sending, are performed by the helper wireless device.

14. The method of claim 10 wherein the source wireless device, the helper wireless device and the destination wireless device are wireless LAN devices, and
    wherein the layer 2 header and the layer 2 second header are 802.11 headers.

15. The method of claim 10 wherein the act of performing authentication includes determining message integrity check information.

16. The method of claim 10 wherein the act of generating the twice modified packet further includes encrypting the data and the authentication information.

17. The method of claim 16 wherein the act of encrypting the data and the authentication information includes performing a WiFi protected access-based encryption.

18. A system for transmitting data from a source wireless device to a destination wireless device, via a helper wireless device, the system comprising:
    a) means for accepting address information of the helper wireless device;
    b) means for determining a layer 2 header for a second hop of a packet including the data from the helper wireless device to the destination wireless device;
    c) means for performing authentication using the layer 2 header and the data to generate a modified packet including authentication information;

d) means for generating a twice modified packet by at least replacing the layer 2 header of the modified packet with a layer 2 second header for a first hop of a packet including the data from the source wireless device to the helper wireless device; and
e) means for transmitting the twice modified packet from the source wireless device to the helper wireless device.

19. The system of claim 18 further comprising:
f) means for receiving the twice modified packet;
g) means for replacing the layer 2 second header of the twice modified packet with the layer 2 header for a second hop of a packet including the data from the helper wireless device to the destination wireless device to obtain a thrice modified packet; and
h) means for sending the thrice modified packet to the destination wireless device.

* * * * *